United States Patent
Anisimovich et al.

(10) Patent No.: US 8,571,264 B2
(45) Date of Patent: Oct. 29, 2013

(54) METHOD OF USING STRUCTURAL MODELS FOR OPTICAL RECOGNITION

(75) Inventors: Konstantin Anisimovich, Moscow (RU); Vadim Tereshchenko, Moscow (RU); Alexander Shamis, Moscow (RU)

(73) Assignee: ABBYY Development LLC, Moscow (RU)

( * ) Notice: Subject to any disclaimer, the term of this patent is extended or adjusted under 35 U.S.C. 154(b) by 187 days.

(21) Appl. No.: 13/209,779

(22) Filed: Aug. 15, 2011

(65) Prior Publication Data
US 2011/0299735 A1 Dec. 8, 2011

Related U.S. Application Data

(63) Continuation-in-part of application No. 10/657,008, filed on Sep. 8, 2003, now Pat. No. 8,036,461.

(51) Int. Cl.
*G06K 9/00* (2006.01)
*G06K 9/34* (2006.01)

(52) U.S. Cl.
USPC .......................... 382/103; 382/173

(58) Field of Classification Search
USPC ......... 382/159, 173, 198, 218, 223, 229, 253, 382/290, 305, 312, 103; 715/268, 269
See application file for complete search history.

(56) References Cited

U.S. PATENT DOCUMENTS

| | | | | |
|---|---|---|---|---|
| 7,131,063 B2 * | 10/2006 | Mateos | ......................... | 715/205 |
| 7,242,805 B1 * | 7/2007 | Reihani | ......................... | 382/198 |

* cited by examiner

*Primary Examiner* — Kanjibhai Patel
(74) *Attorney, Agent, or Firm* — LeighAnn Weiland; Aditya Krishnan

(57) ABSTRACT

A method and system for recognizing all varieties of objects in an image by using structure models are disclosed. Structural elements are sought when comparing a structural model with an image but only within a framework of one or more generated hypotheses. The method for identifying objects includes preliminarily creating a structural model of objects by specifying a plurality of basic geometric structural elements corresponding to one or more portions of the object, recording a spatial characteristic of each identified basic geometric structural element, and recording a relational characteristic for each specified basic geometric structural element. Objects in the image are isolated and a list of hypotheses for each object is provided. Hypotheses are tested by determining if the corresponding group of basic geometric structural elements corresponds to another supposed object described in a classifier. Results of testing of hypotheses may be saved and the results may be used to identify objects.

34 Claims, 6 Drawing Sheets

METHOD OF USING STRUCTURAL MODELS FOR OPTICAL RECOGNITION

CROSS-REFERENCE TO RELATED APPLICATIONS

For purposes of the USPTO extra-statutory requirements, the present application constitutes a continuation-in-part of U.S. patent application Ser. No. 10/657,008 that was filed on 26 Jun. 2003, which is currently co-pending, or is an application of which a currently co-pending application is entitled to the benefit of the filing date. The '008 Application is incorporated herein by reference to the extent that it is not inconsistent with the teachings of this application.

The United States Patent Office (USPTO) has published a notice effectively stating that the USPTO's computer programs require that patent applicants reference both a serial number and indicate whether an application is a continuation or continuation-in-part. Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

The present disclosure relates to a method for optical character recognition of hand-printed, hand-written, and printed characters. Said method can also be used for recognition of any pre-defined objects in an image.

2. Related Art

There are many known image recognition methods that involve a comparison of an input image in the form of initial image units that are aggregated (usually pixels) with a model image of the whole object or a set of possible embodiments of the object stored in a special reference, usually termed a "classifier."

A known group of character recognition methods involve parsing the document into parts presumably containing images of letters followed by further comparison of said images with those stored in one or more special feature and/or raster classifiers.

Another known group of character recognition methods uses structural character descriptions for optical recognition. Two well known, and substantially different, approaches in this group are a linguistic approach and a fuzzy graph matching approach.

The linguistic approach consists of creating a language with a set of rules which are used to direct a search for local image properties and segmenting the image. The contents of individual segments, their positions relative to one another, etc. are then analyzed. The basic features include "corner," "cross," "vertex", and others, which are basic enough to be encountered in many images of one class. Each class of images is associated with a set of rules that describes the given class (e.g. characters, graphic objects) in terms of the selected basic features.

The fuzzy graph matching approach represents character images as graphs. The recognition process in this case consists of finding the minimum transform that transforms the graph of the character to be recognized into a pattern graph.

Existing structural classifiers have significant drawbacks. They compute image features and attempt to represent the object under recognition as a collection of structural elements. As a result, the classifiers must analyze and interpret complex combinations of elements that are not always described in the classifier patterns, and the classifiers must go through multiple possible variants, which greatly slows down the recognition process.

The present invention solves these and other drawbacks in the art by making the recognition of objects more reliable and providing an increased immunity to noise.

SUMMARY

Structural models may be used to recognize all varieties of objects in an image such as handwritten, typed and printed characters, graphical elements, document design elements, reference points, elements of a document form and etc. For example, one method includes isolating objects in an image. From an object a structural model may be created. Creating a structural model may include identifying one or more groups of basic geometric structural elements, recording one or more spatial characteristics for one or more of the basic geometric structural elements, and recording a relational characteristic for one or more of the identified basic geometric structural elements.

For recognition, one or more hypotheses may be generated and provided for testing by matching structural models. Hypotheses are tested by determining if the structural model of corresponding hypothesis corresponds to the object described in the image. Testing may include recording of a testing outcome and successfully identifying objects.

This Summary introduces a selection of concepts and aspects in a simplified form that are further described below in the Detailed Description. This Summary is not intended to identify key or essential features of the claimed subject matter, nor is it intended to be used to limit the scope of the claimed subject matter.

DETAILED DESCRIPTION

Figure 1C:
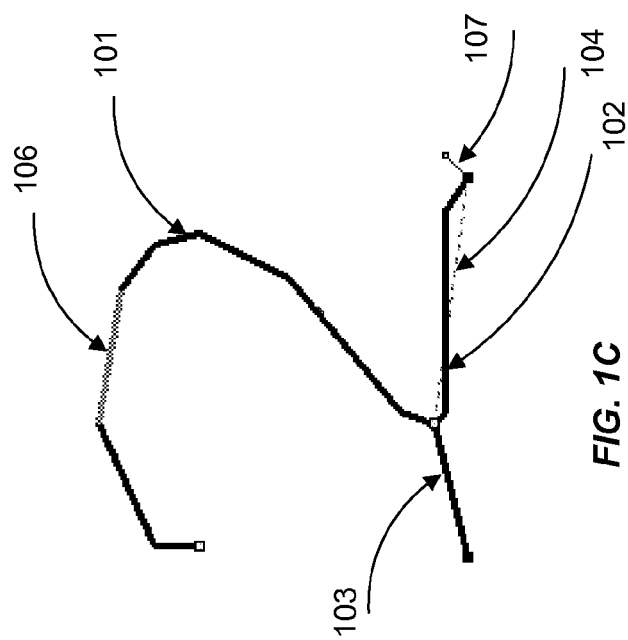
FIG. 1C shows an image matched by structural model of the character shown in FIG. 1B.
Figure 1B:
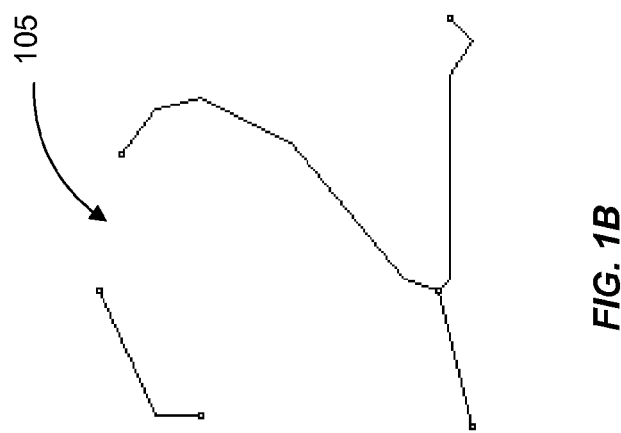
FIG. 1B shows a vectorized version of the character shown in FIG. 1A.
Figure 1A:
FIG. 1A shows a bitmap image of a first exemplary writing of character "2" with a defect or omission in the stroke or strokes used to create the character.
Figure 2C:
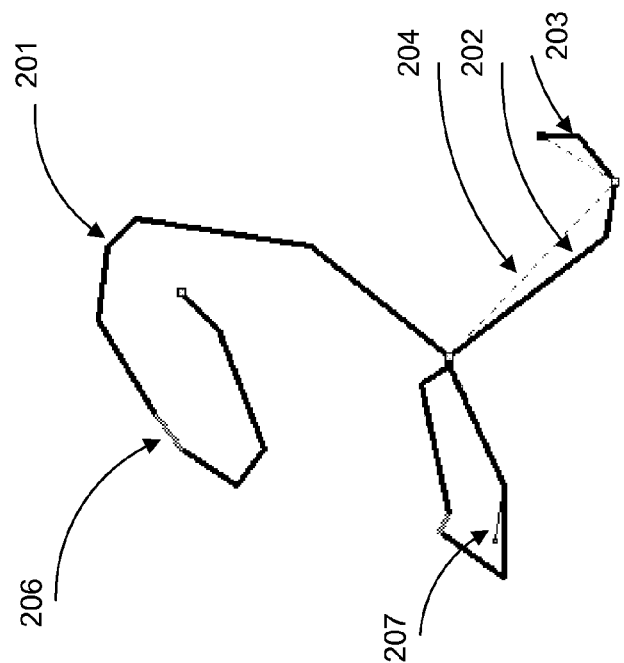
FIG. 2C shows an image matched by structural model of the character shown in FIG. 2B.
Figure 2B:
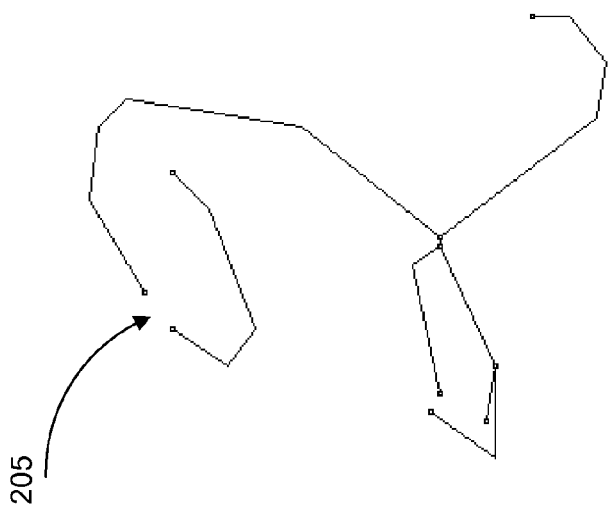
FIG. 2B shows a vectorized version of the character shown in FIG. 2A.
Figure 2A:
FIG. 2A shows a bitmap image of a second exemplary writing of character "2" with a defect or omission in the stroke or strokes used to create the character.
Figure 3C:
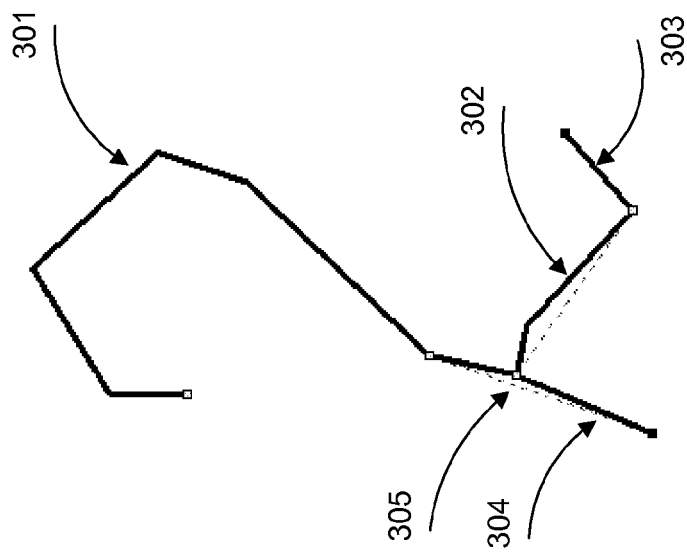
FIG. 3C shows an image matched by structural model of the character shown in FIG. 3B.
Figure 3B:
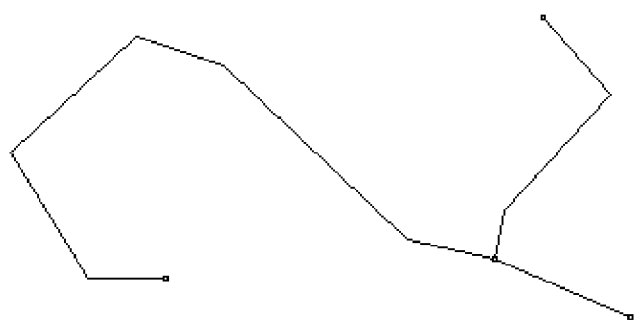
FIG. 3B shows a vectorized version of the character shown in FIG. 3A.
Figure 3A:
FIG. 3A shows a bitmap image of a third exemplary writing of character "2".
Figure 4B:
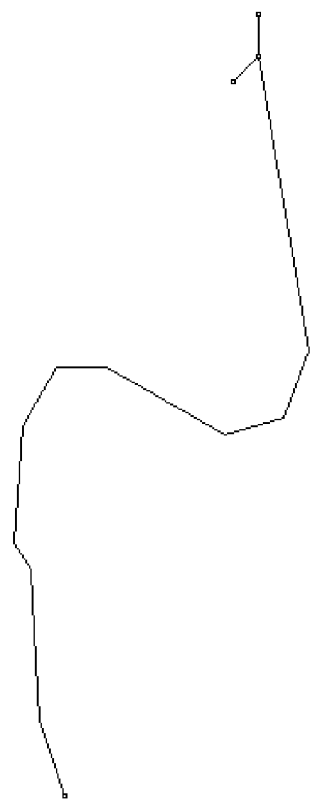
FIG. 4B shows a vectorized version of the character shown in FIG. 4A.
Figure 4A:
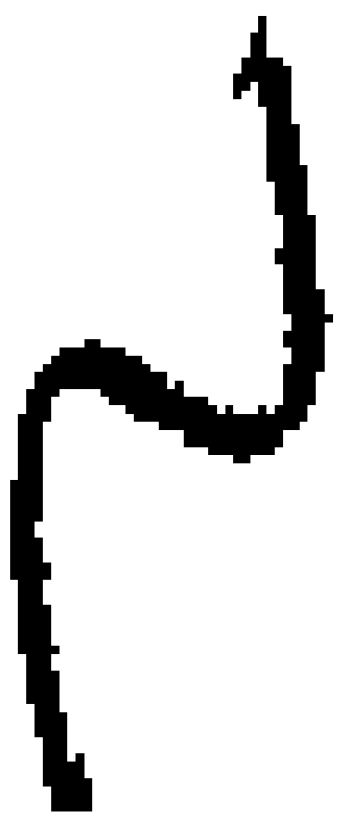
FIG. 4A shows a bitmap image of a fourth exemplary writing of character "2".
Figure 4C:
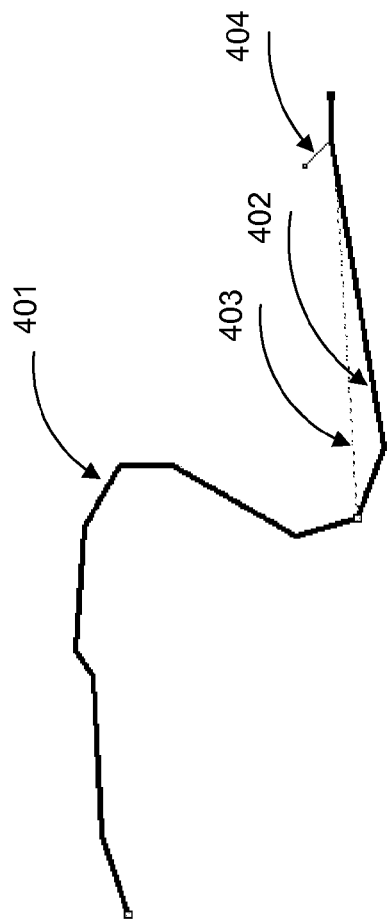
FIG. 4C shows an image matched by structural model of the character shown in FIG. 4B.

The present invention discloses a method of increasing reliability and correctness of object recognition processes. The method includes comparing a recognized object image with a model, described as a set of standard elements of a limited number of types along with a spatially parametrical correlation thereof.

In one embodiment, said standard elements are preliminarily assigned graphic structures of simple (elementary) geometrical forms such as standard elements suitable to form models for recognized objects. Said standard elements can be reliably identified and recognized due to the simple geometrical form thereof. Each standard element comprises more than one pixel (e.g., initial graphical unit).

Standard elements may be provided with a spatial characteristic or a parametric characteristic. Standard elements thus may describe any object including characters of text.

Each recognized object is described as comprising one or more preliminarily assigned standard elements along with a corresponding spatially parametric correlation thereof. The recognized object may comprise standard elements of one or more types. They can differ in relative spatial location (attitude, position), size or other parameters, or can differ in a plurality of parameters simultaneously.

Recognized objects can be of various kinds: document design elements, special graphical elements, reference points or the like. Recognized objects may provide orientation to, for example, a document or form, text elements, printed characters or handwritten type or handwritten characters, etc.

In said embodiment, one or more types of graphical elements of simple form are preliminarily assigned as standard elements to compose recognized objects. Some examples of standard elements are: straight-line segment, circle, oval, and arc.

Said standard elements are remarkable for their high level of identification and recognition reliability in an image due to their geometrical simplicity.

Said standard elements may differ in spatially parametrical characteristics. For example, a straight-line segment may differ in length, incline angle, line thickness (absolute and/or relative), etc. An arc may differ in angle, radius of curvature, orientation, etc.

Said standard elements may comprise white portions—areas with white color, not black or other colored areas and even transparent areas.

A classifier is used for object recognition (e.g., characters, reference points, other kinds of graphical elements) and is filled with object descriptions in a form of sets of standard elements, along with positional relationship(s) and spatially parametrical correlation(s) thereof. The said classifier may be filled with possible deviations of a recognized object image as additional sets of standard elements composing the said object along with one or more positional relationships and one or more relative and/or absolute dimensions thereof. The said object descriptions may differ greatly either by the set of standard elements identified for an object or by their spatially parametrical correlation(s) in relation to the object.

During image processing, standard elements are searched and identified.

In said embodiment, groups of standard elements presumably composing an object are selected. For each said group, a hypothesis is set up and tested about the belonging of all elements of a set as a whole to a supposed object described in the classifier.

In a case where not enough reliable results of the said hypothesis test are obtained, a new hypothesis is set up and tested. The hypothesis is related to whether all elements of a set as a whole belong to another supposed object described in the classifier.

After all possible hypotheses are tested, the most reliable variant of the object (hypothesis) is selected. In the case of ambiguous results from testing of hypotheses, supplementary information or supplementary recognition methods can be used.

Said standard elements may compose more complicated standard elements by joining two or more standard elements into various combinations of elements of similar or various types with different positional relationship(s) and size(s) thereof. For example, a composition of horizontal and vertical straight-line segments forms a cross.

A set of the standard elements composing a recognized object may be described in one or more alternative forms.

A spatially parametrical correlation of standard elements may be described in an alternative.

A recognized object description may be realized in the form of an interval for one or more spatially parametrical correlation values.

A recognized object description may be also realized as a set of standard elements connected by relations of mathematical logic, including, for example, of an "AND" type, of an "OR" type, and of a "NOT" type. A standard elements correlation in a recognized object may be expressed in the form of more than a single-level structure.

The present invention discloses using structural models for object recognition. A classifier uses structural models of characters or any other object, against which an image being recognized is compared. The method may be used for recognition in general including material that is printed, hand-printed, hand-written characters, special graphical elements, document design elements, text elements, reference points or any other elements of document forms. Structural descriptions of a character or another object are characterized by a high degree of generalization and recognition can achieve a high level of recognition accuracy even for highly variable objects, which is particularly important in the case of hand-printed and hand-written characters.

In one embodiment, the present invention includes the use of vector representations of images which model objects by means of a static trajectory of a writing implement. When recognizing objects on a bitmap image, the image may be preliminarily vectorized, in which case any known algorithm may be used to create a vector image from the bitmap original.

According to the disclosed method, a structural model of an individual object is created and subsequently used by the classifier.

An object in a structural model is described by one or more structural elements (such as a line, an arc, a circle, a dot, etc.) or a set of structural elements; and the allowed mutual positioning of the elements is defined by means of structured-metric relations such as line angle, length, intersection of lines, and the like. A relation may be essential (indispensable) or optional. For each element in a structural model, its type and a set of additional attributes may be specified or identified. A structural element is a basic or elementary object (e.g., a dot, a line, an arc, a ring, a cross) which can be easily identified on an image.

The structured-metrical relations may be specified by means of fuzzy logical expressions. Variables used in relations include (1) element attributes like length restriction, range of angles, deviation from direct line, etc., and (2) coordinates of characteristic object points, such as ends and extrema. A structural model may specify the ranges of allowed values for the attributes of each structural element and size relations of the structural elements. In the case of a line, for example, the range of possible angles and a maximum deviation from the straight line may be specified.

In one embodiment, the relations may be written consecutively and the results may be joined by AND, OR, and NOT operators (for example) and grouped using parentheses. Additionally, variables, comparison operators (e.g. =, <, >, <=, >=, !=, on the left, on the right, above, below), etc., may be used to specify relationships.

The structural description of an object (i.e., structural model) defines the positions and attributes of its parts, effectively marking up the object. The coordinates of all of its characteristic points may thus be obtained (e.g., isolated ends, intersections of lines, or points that divide the image into parts).

The disclosed classifier is based on the principles of integrity and purposefulness. According to the principle of integrity, an object should be considered as a "whole" consisting of many interrelated parts bound by spatial-metrical relationships.

According to the principle of purposefulness, recognition is a process of generation and purposeful verification of hypotheses about a given object. The list of hypotheses is provided to the classifier and may include either several variants or a complete list of objects whose structural models are available to the classifier. In one embodiment, hypotheses may originate, for example, from contextual data and/or from other, fast-working, classifiers whose results are not sufficiently reliable and need verification.

Next, the classifier makes use of structural models of the generated hypotheses, which are compared directly with the object image rather than with its pre-computed features. Structural elements are not identified in advance on the object image. Instead, they are purposefully searched for when comparing the structural model with the image and only within the framework of a generated hypothesis.

Verifying a hypothesis may consist, for example, in checking if the relationships described in the structural model are true, i.e., checking that a certain value is within a certain fuzzy range. This check produces an estimate which shows how well a relationship holds or how well the image of a whole object corresponds to a structural model.

In other words, an attempt is made to describe an object image by means of a verified model and the degree of correspondence between the two is evaluated. Then the variant is selected whose structural model best describes the object under recognition. During verification, the suggested variants (i.e., hypotheses) are arranged from most reliable to least reliable.

Each structural element may have more than one correspondence (alternate version of matching). If this is the case, all the possible variants are verified independently. Once all the elements used in a relation have been identified, the relation is immediately verified. To avoid analyzing too many variants at the earlier stages, the verification of the current hypothesis is stopped if an essential (indispensable) relation in this variant is false.

It should also be noted, that if an object under recognition ideally matches a structural model, the elements of the model should completely cover the original object image. However, this is not always possible to achieve due to noise and image defects. The portions of the object image not covered by the elements are penalized, to avoid discarding relevant image portions. For example, the letter "P" could be easily found in an image of letter "B" if discarding a portion of its image not covered by the structural elements.

One and the same object may be represented in different ways (i.e., different or alternative representations may look differently with respect to one another). As an illustrative example, character "a" (small letter) may be represented or written like "c/" (in a first font or a first exemplary instance of a particular handwritten letter), "a" (in a second font or a second exemplary instance of a particular handwritten letter), "a" (in a third font or a third exemplary instance of a particular handwritten letter) or in some other way. If this is the case, one object may have several structural models, different for each representation. Furthermore, each object representation may be described by different sets of structural elements and relations. So, for verification of an "a"-hypothesis, a model of character "a" with the best matching is selected, i.e., the model which covers the original image with a best coincidence.

If the verification of the hypotheses results in two or more structural models having almost identical reliability, additional sets of features may be used to identify a best coincidence. These features may be described in advance, individually for each pair of similar (i.e., likely to be mixed up) objects. Descriptions of additional features may use the attributes of the identified structural elements. For example, to distinguish between the numbers "1" and "7," the angle between their two lines may be used. Additionally, contextual data may be used in such cases (for example, to distinguish between the number "1" and the letter "l", or between the number "0" and the letter "O").

Thus, instead the traditional approach of interpreting what can be observed in the image, the disclosed invention purposefully searches for what is expected in the image. This allows reliable identification of structural elements even in images with defects (e.g. line gaps or distorted images) and considerably speeds up the recognition process.

EXEMPLARY EMBODIMENT

In an exemplary embodiment, the following set of structural elements is considered: a dot, a line, an arc, and a ring. These elements are easy to describe in structural models and to use in searches. This set is sufficient to describe the majority of possible objects to be recognized, including characters. This example shows how this set of elements is used to recognize hand-written characters.

For purposes of hand-written recognition, a line element should imply an integral line, i.e., a polygonal line consisting of the original lines of the vector image. In the event of distortions, e.g., where there are small gaps between the lines, virtual lines may be used to fill in such gaps. The polygonal line that makes up an integral line may not be self-intersecting. Various constraints may be imposed on a polygonal line, such as the length of the line relative to a size of the object image, its direction or declivity angle, the length of allowed gaps, etc. These constraints are specified in the structural model as fuzzy ranges of allowed values. To rate the quality of a line element matching, its straightness compared with the rectifying line that joins the ends of the integral line, penalties for gaps, and imposition of various additional conditions may be used. Gaps may be penalized, for example, in proportion to gap size.

An arc element is identified as an oriented open-ended curved (convex) polygonal line that consists of the original lines of the vector image and the virtual lines that fill in the gaps. An arc should have only one direction of the curve (convexity) along the whole length. To suppress distortions, local deviations of the direction of the curve are allowed. Likewise, a structural model may specify requirements for the element to be identified, e.g., its direction, curvature, size, etc. To rate the quality of an arc element matching, penalties for gaps, deviations from the direction of the curve, orientation of tangent line, and imposition of various additional conditions may be used.

A ring element is identified similarly to an arc element. The beginning of a ring element coincides with its end.

A dot element is identified as a group of original connected lines of the vector image whose enclosing rectangle, or frame, does not exceed a certain size, specified in the model.

For each element, the model may specify the search parameters for starting points, i.e., points from which identification of structural elements begins.

In one embodiment, to distinguish a pair of similar objects (for example, when there is confusion between a pair of objects) an additional classifier or a differential classifier may be used. A differential classifier is a linear classifier trained for separating two similar classes. The differential classifier may use an individual set of additional features or information which is characteristic for a particular pair. The purpose of a differential classifier is selecting between two competing hypotheses the one which is more appropriate.

For each pair, an individual differential classifier may be created. A list of confusing or confused pairs of objects may be preliminary assigned and a differential classifier for each pair may be preliminary trained. Previously identified structural elements and results of structural model matching are extensively used for describing and identifying individual features of differential classifiers. The structural model matching provides exhaustive information about object structure, so individual distinguishing features may be simply described.

An example illustrates differential classifiers. The handwritten numbers "1" and "7" appear similar to each other in an image. In this example, during processing, matching of an object image using structural models of "1" and "7" gives a similar estimation of reliability. Accordingly, a "1"-hypothesis and a "7"-hypothesis are considered competitive for the object image. A distinguishing feature for numbers "1" and "7" is an angle between their two lines. After structural model matching, the two line elements are identified on an object in the image and exhaustive information about object structure is obtained; a subtle distinction of angle may be identified, simply described and used to accurately distinguish whether a "1" or a "7" is in the image.

In a preferred implementation, a differential classifier based on information of object structure is a stiffly accurate classifier which enables processing to achieve a very high amount of recognition accuracy.

FIGS. 1A, 2A, 3A and 4A show bitmap images of different ways of writing a character "2." FIGS. 1B, 2B, 3B and 4B show vectorized representations of the respective images. FIGS. 1C, 2C, 3C and 4C show vectorized images matched to a structural model of character "2", i.e. FIGS. 1C, 2C, 3C and 4C are the respective images with identified structural elements.

In the structural model, character "2" is described by using of two essential elements—arc and line (with specified parameters). Character "2" may be additionally described with several optional line elements, for which parameters are also specified. FIGS. 1A, 2A, 3A and 4A illustrate that such structural models can each describe a very variable writing or form of character "2". Forms other than those shown in FIGS. 1A, 2A, 3A and 4A are possible. If these images are verified by a "2"-hypothesis (a hypothesis corresponding to the character "2"), the structural elements defined in the model are purposefully searched in, within or on the images. In FIGS. 1C, 2C, 3C and 4C, identified elements are shown such as an essential arc element (101, 201, 301 and 401), an essential line element (102, 202, 302 and 402), and some optional line elements (103, 203, 303 and 304). Also in FIGS. 1C, 2C, 3C and 4C rectifying lines (104, 204, 305, 403 and others) that join ends of integral lines are shown for some identified line elements. In the event of one or more distortions, e.g. gaps (105, 205), virtual lines (106, 206) are used to fill in such gaps. There may be portions of an image not covered by elements, e.g. 107, 207 and 404.

Figure 5:
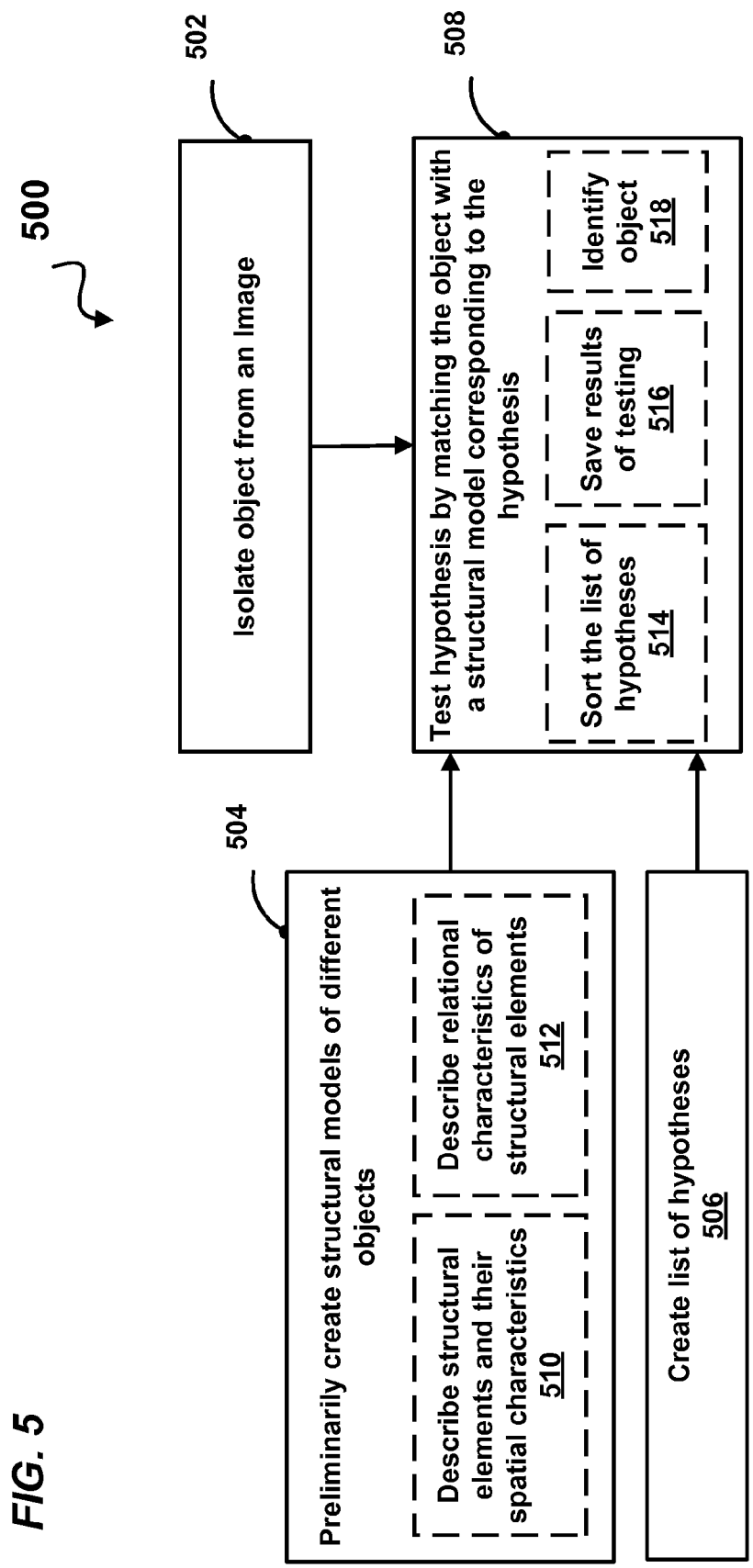
FIG. 5 shows a flowchart of an exemplary implementation of the method to identify objects in an image.

FIG. 5 shows a flowchart of an exemplary implementation of a method to identify objects in an image. With reference to FIG. 5, at step 502, an object is isolated from an image. Independently, without regard to an object of an image, at step 504, a structural model of the isolated object is created. Creation of such structural model may include: (step 510) identifying or describing geometric structural elements and their spatial characteristics, and (step 514) describing one or more relational characteristics for one or more identified geometric structural elements. In a preferred implementation, at least one spatial characteristic and at least one relational characteristic is captured or recorded for each identified geometric structural element.

At step 506, one or more hypotheses are generated for each group of identified (basic) geometric structural elements.

At step 508, hypotheses are tested by determining if or whether the corresponding group of geometric structural elements corresponds to another supposed object described in the classifier. Testing may include sorting the list of hypotheses (step 514), recording or saving an outcome of testing of the one or more hypotheses (step 516) and identifying objects (step 518).

Figure 6:
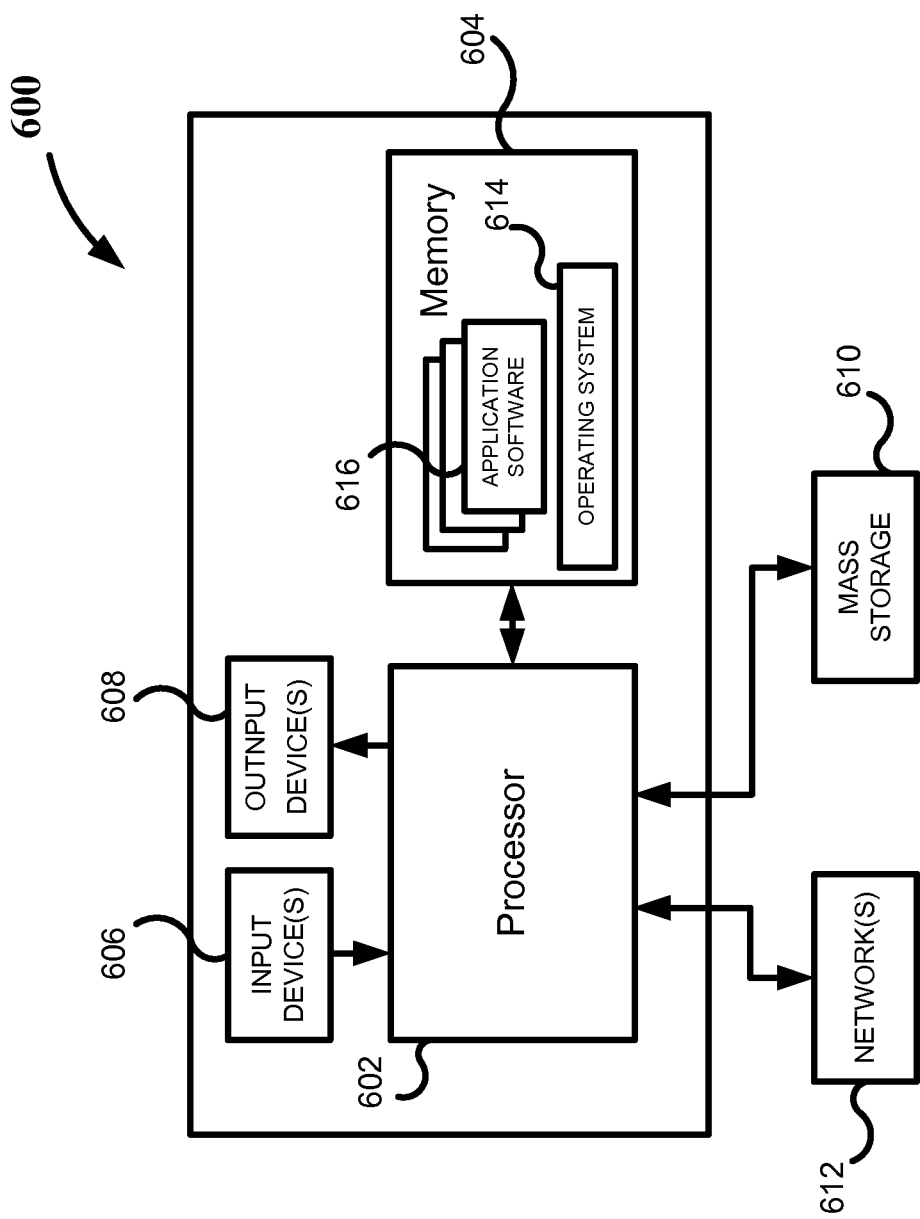
FIG. 6 shows exemplary hardware for implementing the searching system using the techniques described in this application, in accordance with an implementation of the present disclosure.

FIG. 6 of the drawings shows an exemplary hardware 600 that may be used to implement the present invention. Referring to FIG. 6, the hardware 600 typically includes at least one processor 602 coupled to a memory 604. The processor 602 may represent one or more processors (e.g. microprocessors), and the memory 604 may represent random access memory (RAM) devices comprising a main storage of the hardware 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, imaging device, scanner, etc.) and a one or more output devices 608 (e.g., a Liquid Crystal Display (LCD) panel, a sound playback device (speaker).

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc. to implement the techniques described above. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for recognizing an object in an image, the method comprising:
    capturing the image by an image sensor;
    preliminarily assigning a plurality of geometric structural elements and creating at least one structural model of each different object of a plurality of objects that could be found in the image, wherein a structural model describes an object as one including at least one geometric structural element;
    creating a classifier, wherein the classifier is capable of comparing structural models for objects against a vector representation for an object in the image;
    isolating the object from the image via instructions executing on a processor of a computing device;
    providing at least one hypothesis about the isolated object;
    testing the at least one hypothesis by matching a vector representation for the isolated object with at least one structural model of the provided hypothesis, wherein structural elements described in a structural model are searched in the vector image of the object;
    identifying a variant of the structural model that matches the object; and
    saving in an electronic storage a result of the testing of at least one hypothesis.

2. The method of claim 1 wherein preliminarily creating the at least one structural model of each different object includes identifying and storing in the electronic storage an allowed set of values for one or more attributes associated with each of the geometric structural elements.

3. The method of claim 2 wherein an attribute of a geometric structural element includes a comparison operator in relation to another attribute associated with another geometric structural element.

4. The method of claim 1 wherein creating the at least one structural model of each different object includes identifying and storing a size relation for each of the geometric structural elements, the said size relation being relative to one or more other geometric structural elements.

5. The method of claim 4 wherein the relational characteristic is expressed as a combination of relational characteristics combined by one or more logical operators.

6. The method of claim 1 wherein testing the at least one hypothesis comprises determining a correspondence between the structural model and the object in the image or estimating a confidence of the at least one hypothesis.

7. The method of claim 6 wherein the correspondence takes into account portions of the object image not covered by structural elements.

8. The method of claim 1 wherein testing the at least one hypothesis comprises ordering a plurality of hypotheses, and sorting a plurality of hypotheses from a most reliable hypothesis to a least reliable hypothesis.

9. The method of claim 1 wherein the method further comprises adding and testing a new hypothesis, the new hypothesis being selected in part on the testing of the said at least one hypothesis.

10. The method of claim 1 wherein the method further comprises identifying the object by contextual information in addition to the said testing the at least one hypothesis.

11. The method of claim 1, wherein the object to be recognized is a character.

12. The method of claim 8, wherein the method further comprises using at least one differential classifier preliminarily created for at least one distinguishing feature of the object and reordering the sorted plurality of hypotheses for more precise sorting of two or more hypotheses from each other.

13. The method of claim 12, wherein the differential classifier uses the results of structural model matching for describing and searching the distinguishing feature.

14. A physical storage device having stored computer-executable instructions that, when executed by a processor of a computing system that is in communication with the physical storage device, cause the computing system to perform a method, the instructions comprising:
 instructions for obtaining at least one structural description and at least one vector representation for each object in an image, wherein each structural description includes a spatial-metrical relationship for each structural element relative to at least another structural element;
 instructions for creating a structural model for each object;
 instructions for creating a classifier, wherein the classifier is capable of comparing variants of the object's structural model against a vector representation for the object;
 instructions for comparing, by the classifier, each object against its respective structural model; and
 instructions for identifying a variant of the object's structural model that matches the object.

15. The physical storage device of claim 14, wherein the structural model for each object includes one or more structural elements and at least one instance of positioning information for each element.

16. The physical storage device of claim 15, wherein the positioning information for each element includes relational information for each element relative to another element of the respective object.

17. The physical storage device of claim 16, wherein relational information for an element is indispensable when identifying a variant that best matches the object's structural model.

18. The physical storage device of claim 16, wherein the spatial-metrical relationships for each object are specified by one or more fuzzy logical expressions.

19. The physical storage device of claim 16, wherein the structural model for each object includes allowable values for each attribute of each structural element.

20. The physical storage device of claim 15, wherein the vector representation for each object includes a static trajectory.

21. A computer system comprising:
 at least one processor;
 a sensor for receiving an image;
 a system memory; and
 stored computer-executable instructions which, when executed by the at least one processor, cause the system to:
  receive the image by the sensor;
  isolate an object from the image;
  preliminarily assign a plurality of geometric structural elements and create at least one structural model of each different object of a plurality of objects that could be found in the image, wherein a structural model describes an object as one consisting of at least one geometric structural element;
  provide at least one hypothesis about the isolated object;
  test the at least one hypothesis by matching the isolated object with structural models of the at least one generated hypothesis, wherein structural elements described in a structural model are searched in the image; and
  present an indication of a result of the testing of at least one hypothesis.

22. The computer system of claim 21, wherein the object is one or more of the following: a printed character, a hand-printed character, a handwritten character, a graphical element, a document design element, a text element, a reference point, and an element of a document form; and wherein the structural model of the object is a vector structural model of the object.

23. The system of claim 21, wherein creating the at least one structural model of each different object includes identifying and storing in an electronic storage component an allowed set of values for one or more attributes associated with at least one of the plurality of geometric structural elements.

24. The system of claim 21, wherein an attribute of a geometric structural element includes a comparison operator in relation to another attribute associated with another geometric structural element.

25. The system of claim 21, wherein creating the at least one structural model of each different object includes identifying and storing a size relation for each of the geometric structural elements, the said size relation being relative to one or more other geometric structural elements.

26. The system of claim 25, wherein the relational characteristic (size relation) is expressed as a combination of relational characteristics combined by one or more logical operators.

27. The system of claim 25, wherein testing the at least one hypothesis includes determining a correspondence between one or more of the at least one structural model and the object in the image or estimating a confidence of the at least one hypothesis.

28. The system of claim 27, wherein the correspondence takes into account portions of the object image not covered by structural elements.

29. The system of claim 21, wherein testing the at least one hypothesis includes ordering a plurality of hypotheses, and sorting the plurality of hypotheses from a most reliable hypothesis to a least reliable hypothesis.

30. The system of claim 21, wherein the instructions further cause the system to: add and test a new hypothesis, the new hypothesis being selected in part on the testing of the said at least one hypothesis.

31. The system of claim 21, wherein the instructions further cause the system to: identify the object by contextual information in addition to the said testing the at least one hypothesis.

32. The system of claim 21, wherein the object to be recognized is a character.

33. The system of claim 29, wherein the instructions further cause the system to: use at least one differential classifier preliminarily created for at least one distinguishing feature of the object, and reorder the sorted plurality of hypotheses for more precisely sorting of two or more hypotheses one from another.

34. The system of claim 33, wherein the at least one differential classifier uses the results of structural model matching for describing and searching the distinguishing feature.

* * * * *